SUSPENDED PRESSURIZED GAS OPERATED PAPER CONE PROJECTOR
Original Filed Jan. 3, 1967
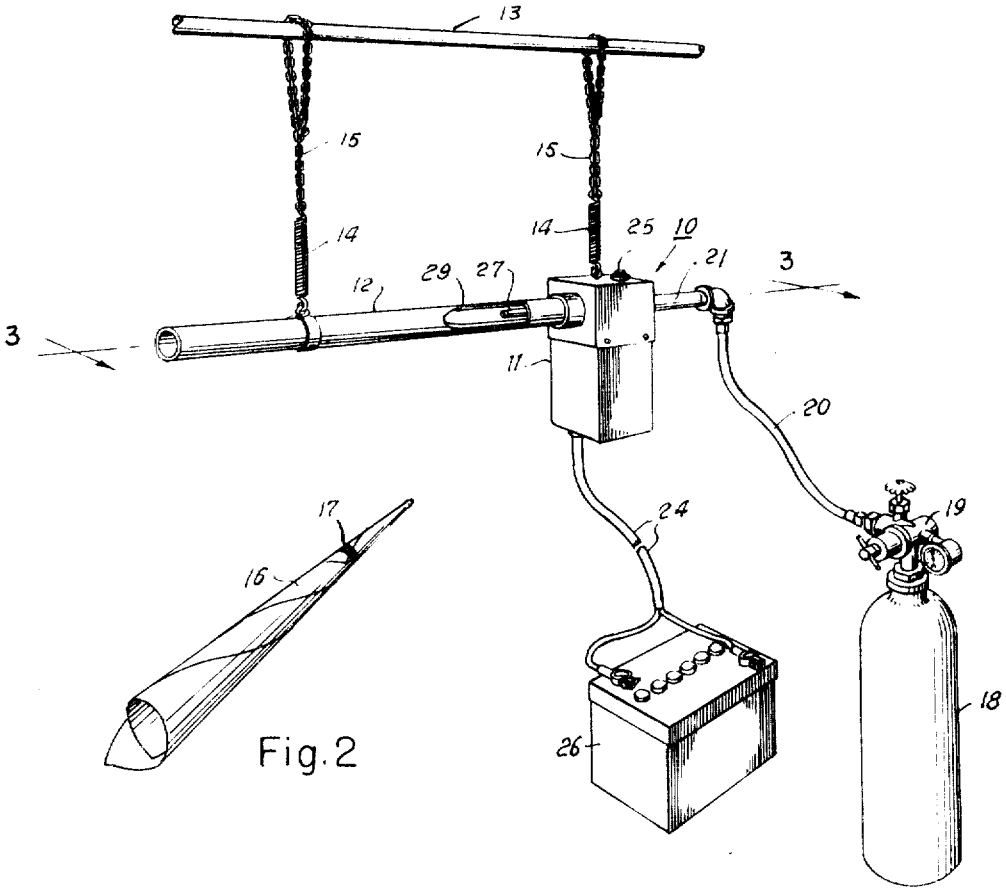
Fig. 2
Fig. 1
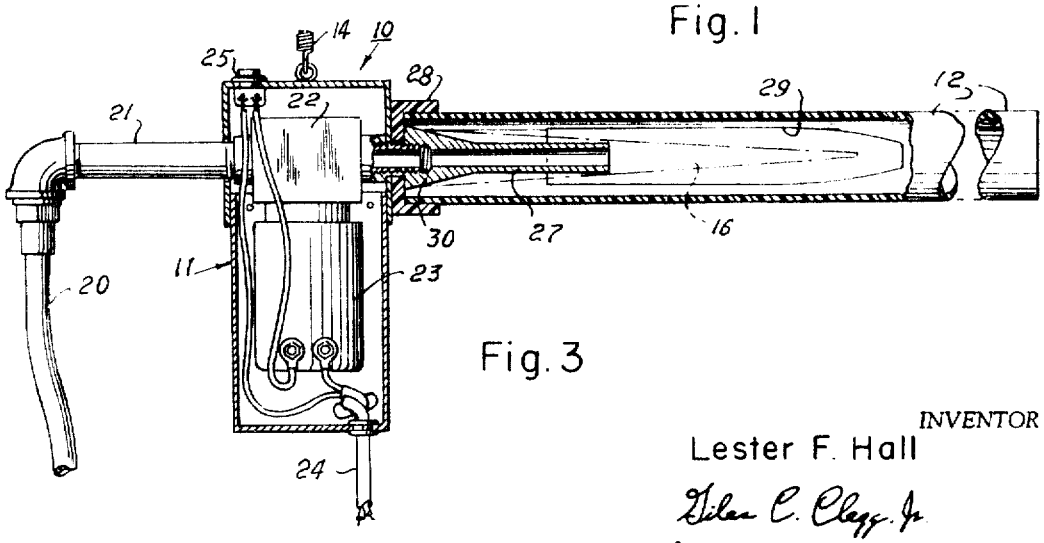
Fig. 3
INVENTOR
Lester F. Hall
BY
Giles C. Clegg, Jr.
John D. Graham
ATTORNEYS United States Patent Office Re. 26,662
Reissued Sept. 9, 1969

26,662

SUSPENDED PRESSURIZED GAS OPERATED PAPER CONE PROJECTOR

Lester F. Hall, 5907 Sherry Lane, Dallas, Tex. 75225

Original No. 3,345,977, dated Oct. 10, 1967, Ser. No. 606,856, Jan. 3, 1967. Application for reissue Sept. 11, 1968, Ser. No. 765,703

Int. Cl. F41f *1/04, 7/02*

U.S. Cl. 124—11 7 Claims

Matter enclosed in heavy brackets [ ] appears in the original patent but forms no part of this reissue specification; matter printed in italics indicates the additions made by reissue.

*ABSTRACT OF THE DISCLOSURE*

A gun-like assembly for firing papers rolled into cone shape from a moving vehicle by means of compressed gas controlled by a solenoid valve.

Presently one of the most effective methods for advertising or obtaining sales leads, particularly for companies offering services in the medical insurance field, is by direct distribution of advertising material which includes a return postcard attached thereto. Direct mail advertising has become prohibitively expensive due to the increased postage rates, the cost of obtaining mailing lists, and the cost of individually addressing the material. Thus, direct distribution of the material to houses in residential areas has been increasingly relied upon. Persons hired to distribute this material by hand are usually itinerant laborers who have unfortunately caused considerable irritation on the part of homeowners. These persons must, of course, deliver the material on foot and go onto the property for each house, often tramping paths across lawns and causing barking of dogs, etc. Thus, various means have been conceived for distributing the material from the street, that is by projecting the material from the street to the doorstep by a gun-like device. Devices of this type previously used have been characterized by being rather inaccurate, resulting in the advertising leaflet being left in the yard or in the shrubbery around the front of the house but far removed from the porch or doorstep where it would most likely be picked up and read by the resident and thus serve its intended purpose.

Material such as this left exposed to the weather will, of course, be unlikely to be found by the resident and will also become damp or bleached out, thus being unattractive to the resident who will merely be annoyed at the imposition and dispose of the material as trash. However, if the material can be presented in an attractive manner conveniently near or on the doorstep or on the front porch, it will be examined and quite often responded to by the resident. Devices previously used for distributing this material from the street have had the further disadvantage of being prohibitively expensive and complex, resulting in a cost for distributing the material which approaches that of direct mailing or hand delivery.

It is, therefore, the principal object of this invention to provide a technique or apparatus for distributing paper material to houses in residential areas in a very accurate manner at a minimum cost. Another object is to provide apparatus for distributing papers such as advertising leaflets to houses along residential streets, such apparatus being adapted to project the material from the street to the doorstep or porch without requiring entry onto the property. A further object is to provide such distribution apparatus which is inexpensive and simple to operate, yet quite accurate in projecting the material.

In accordance with this invention, a gun-like device is provided for shooting the advertising material, rolled into cones of paper, from an automobile moving along the street. The apparatus uses compressed gas as the propellant, the gas being released, under the control of the operator, into an elongated tube or barrel by means of an electrically operated solenoid valve. The use of this solenoid valve is an important feature of the invention in that it provides an accurate and repeatable charge of compressed gas to propel the cone through the same trajectory each time regardless of the manner in which the operator actuates the valve. To this end, the valve is operated by a solenoid which is energized through a normally open pushbuton electrical switch. To further insure the accuracy and repeatability of the trajectory of the cone, a nozzle arrangement for directing the charge of pressurized gas into the cone is provided at the breech of the tube or barrel. This nozzle extends into the open end of the cone and is shaped to hold the cone at an intermediate point along the length of the cone and also shaped to hold the cone firmly at its base so that the cones will receive the charge of compressed gas while in the same position each time. An access hole is provided near the breech of the barrel so that the operator may easily and quickly insert a paper cone over the nozzle. The angular position of the projector is adjustable with respect to the automobile so that varying lengths of trajectory may be provided, this adjustment preferably being provided by a pair of chain and spring assemblies connected from the projector and barrel to a rod suspended transversely across the overhead in the back seat of the automobile. It will be noted that the paper cones used for projectiles may be stacked upon one another so that many thousands may be stored for ready access in the automobile, and the projector assembly is small enough so that two of the devices may be mounted in the back seat of an automobile, permitting distribution to houses on both sides of the street at one time. Accordingly, the distribution apparatus of this invention provides a means for rapidly yet quite accurately distributing advertising materials in residential areas while requiring a minimum of investment in the equipment and necessitating no unusual skill or training on the part of the operators in the field.

The novel features believed characteristic of this invention are set forth in the appended claims. This invention itself, however, as well as further objects and advantages thereof, will be best understood by reference to the following detailed description of a particular embodiment, when read in conjunction with the accompanying drawings wherein:

FIGURE 1 is a pictorial view of apparatus adapted to be mounted in an automobile for distributing advertising circulars of the type adapted to be rolled into a cone shape;

FIGURE 2 is an enlarged pictorial view of a paper cone of the type used with the apparatus of FIGURE 1; and FIGURE 3 is a sectional view of a portion of the apparatus of FIGURE 1, taken along the line 3—3 of FIGURE 1.

With reference now to FIGURE 1, a gun-like device is shown which is adapted for rapid and accurate propelling of advertising circulars or the like from a moving automobile. This apparatus comprises a gun-like assembly 10 which includes a housing 11 from which extends an elongated tube or barrel 12. The assembly 10 is supported from a rod 13 which preferably extends across the top of the back seat of the automobile and is of the type ordinarily used as a garment rack. The rod 13 is an item which is commercially available in auto accessory stores and is usually held at each end against the upper inside edge of the door frame in the back seat of the car, with the rod 13 extending transversely across the ceiling of the back seat about one or two inches below the overhead of the car. Two adjustable and resilient support means are used for suspending the projector assembly 10 from the rod 13, these each including a spring 14 and a chain 15. Each of the chains 15 may be adjusted as illustrated by hooking the end of the chain in the appropriate link. Thus, the projector assembly 10 may be aimed according to the setback of the houses along a given street and will remain tilted at this angle so that the operator need not be constantly concerned with aiming the projector 10 but can concentrate on rapidly loading and firing at the proper time according to travel of the automobile along the street. However, the springs 14 permit a vertical adjustment of the direction in which the projector 10 is aimed so that for houses which depart from the average set-back along a given street, the projector may be correctly aimed. Also, if the operator does not fire the projector at the correct instant as the auto travels along the street, he can by pushing forward on the housing 11 still fire at the proper target due to the yielding action of the springs 14.

The projectiles fired by the apparatus of FIGURE 1 consist of paper cones 16 as illustrated in FIGURE 2. These paper cones would ordinarily be advertising circulars or leaflets composed of ordinary bond weight or perhaps light cardboard, usually about letter size, rolled into a cone shape and held in place by a length of masking tape 17. It will be noted that with the improved projector assembly of this invention there is no need for weighting the cones 16 as by a plastic ring or similar device which has been necessary in previous attempts at providing a projector of this type. The cones 16 may be stacked upon another so that a very large number of the cones may be stored in the back seat of any automobile for ready access by the operator of the projector. Thus, many thousands of the cones 16 may be distributed without concern for returning to a central location to replenish the supply. Also, it will be noted that the cones 16, not being weighted, do not present a safety hazard when fired out of the projector assembly 10. After only a few feet of travel the velocity, weight and momentum of the projected cone 16 are such that no danger to person or property exists. Even at the exit from the barrel 12, the projected cone is no significant hazard due to its light weight and the means for projecting.

The cones 16 are propelled from the assembly 10 by a charge of compressed gas, such as $CO_2$, which is supplied from a gas cylinder 18 as seen in FIGURE 1. The cylinder 18 is, of course, of the type commercially available and would ordinarily contain carbon dioxide. A regulator valve 19 of conventional form is used to release about 50 p.s.i. of the compressed gas to a supply line 20. Of course the pressure in the supply line 20 may be adjusted by the regulator valve as required for properly projecting the cone 16. For example, the weight of the paper used for the cones and the distance which the cones need to be projected may require a different supply pressure. Extending from the back of the housing 11 is a short length of pipe 21 at the end of which is an elbow and suitable fitting for connection to the supply line 20. The pipe 21 also functions as a handle to be grasped by the operator for adjusting the aim of the projector assembly 10.

Within the housing 11, as will be seen by reference to the sectional view in FIGURE 3, the pipe 21 is connected to an input fitting of a solenoid operated valve 22, this valve 22 being normally closed but opened by a solenoid 23. An electrical supply for operating the solenoid 23 is provided by a line 24 entering the bottom of the housing 11, one side of the line being, of course, connected directly to a terminal of the solenoid 23 while the other side of the line is connected through a normally open pushbutton switch 25 located at the top of the housing. Thus, when the pushbutton switch 25 is depressed by the operator the electrical circuit to the solenoid will be completed and the solenoid 23 will actuate or open the valve 22. The assembly including the valve 22 and the solenoid 23 is a commercially available unit which need not be described in detail here; however, it will be understood that the use of an electrically operated valve, actuated by a pushbutton switch, is an important feature of the preferred embodiment of the invention because of the characteristics of this type of valve as being very rapidly opened when the solenoid is electrically energized and also due to the fact that the speed at which the valve opens will not be dependent upon the manner in which the person operating the device pushes the switch or lever. A mechanically operated valve would not produce the desired results because it would not only open slower as compared to an electrically operated valve, thus not producing a charge of compressed gas to propel the projectile properly, but also the repeatability of the charge of compressed gas would be too variable and dependent upon the manner in which the person operating the device actuated whatever operating mechanism was used. In the present invention, the pushbutton switch 25 will always be either open or closed with no intermediate position possible. Thus, actuation of the solenoid 23, and thus the valve 22, will always be the same. It is noted that the electrical supply line 24 is connected to the automobile battery 26, ordinarily a 12 volt battery, and so no auxiliary equipment is necessary for the projector assembly 10 other than the gas supply cylinder 18 and its regulator valve.

Upon depression of the pushbutton switch 25 by the operator, a charge of compressed gas is thus released to an output port of the valve 22. A nozzle 27 extending into the barrel 12 is connected to the output port of the valve 22 by a suitable fitting. This nozzle 27 also holds a plastic cup 28 in place against the housing 11, this cup 28 functioning to hold the plastic tube or barrel 12 in place by a press fit. The projectiles or paper cones 16 are fitted over the nozzle 27 by the operator, access for loading being provided by a hole 29 near the breach of the barrel 12. The firing position for one of the cones 16 is shown in phantom in FIGURE 3. It is noted that the rear end of the nozzle 27 is flared out into a cone-like shape 30. An important feature of the invention is that the nozzle 27 from which the charge of propellant gas is expelled extends a substantial distance within the projectile or cone 16, and that the nozzle is flared out or shaped to hold the cone in a fairly fixed position at its base. It is noted that the outer end of the nozzle 27 also maintains the cone 16 at a fairly fixed position at about its mid point. Thus, while the assembly 10 may be rapidly and easily loaded from the breach, still the cone 16 is held in a fixed position about the projecting nozzle so that in successive firing the paths of the projectiles will be repeated accurately.

It is to be noted that two of the assemblies 10 as seen in FIGURE 1 may be mounted in the back seat of an automobile pointing in opposite directions so that the cones 16 may be distributed to the porches or door steps of houses on both sides of the street with only one pass of the automobile. Of course, two operators would be needed in the back seat, but yet it is understood that only one pressurized gas supply cylinder 18 would be necessary. In this case it is especially important that a wide variation in the possible length of the trajectory be provided since the car would ordinarily be on one side of the street, in the righthand lane, and so the distance to the doorstep of the houses on the right would be much shorter than that on the left. Also, the form of the projectiles, that is the paper cones which may be stacked closely together and many of them stored in a small space, is especially important when two operators and two of the units 10 are located in the back seat of a car since enough of the cones 16 must also be stored for ready access.

For operation in cold weather, it is desirable that the car windows not be completely opened. Thus, for the comfort of the operators and driver a clear Plexiglas sheet may be fitted into the car windows on each side with a hole large enough for the barrel 12 to extend therethrough, in which case the spring 14 and chain 15 attached to the barrel 12 would be dispensed with as the barrel would be supported by the Plexiglas sheet in the car window. In this case the only adjustment would be by means of the spring 14 and chain 15 which is attached to the housing 11 and extends up to the rod 13, the adjustment provided by this simple support thereby being especially important for aiming the projector assembly.

It is to be understood that a projector arrangement has been provided by the apparatus of this invention which makes maximum provision for the repeatability of the trajectory of the cones which are fired. This repeatability feature is a result of the use of an electrically operated solenoid valve as distinguished from a mechanically operated valve or the like. The preferred valve gives a quick release of a charge of pressurized gas, the charge being the same every time regardless of the way the person operating the device actuates the assembly. Also the shape of the nozzle used to direct the charge of pressurized gas into the cone shaped projectile and its size relative to the projectile is important in obtaining the desired repeatability. In addition, the adjustable supports used for aiming the projector assembly and maintaining it in a fairly fixed angular position, while at the same time permitting some variation when desired by means of the springs, results in greater accuracy and repeatability while at the same time permitting rapid and simple loading and firing by the operator. The form and shape of the projectiles, i.e., paper cones held by tape, are important to the invention in that a large supply can be stacked for ready access in the automobile while the cones provide no safety hazard and at the same time traverse a fairly accurate path. All of these factors result in a greatly improved technique for distributing advertising material at a minimum cost and with a maximum probability that the material will be attractively presented to the recipient.

While this invention has been described with reference to particular embodiments, it is, of course, understood that this description is not meant to be construed in a limiting sense. Various modifications of the disclosed embodiments, as well as other embodiments of the invention, will be apparent to persons skilled in the art upon reference to this specification. It is, therefore, contemplated that the appended claims will cover any such modifications or embodiments as fall within the true scope of the invention.

What is claimed is:

1. Apparatus for projecting paper cones or the like from within a moving vehicle comprising an elongated barrel, an electrically operated solenoid valve assembly connected to one end of the barrel with an input to the valve being connected by a flexible conduit to a supply of pressurized gas, means including an electrical switch associated with said assembly for releasing pressurized gas into said barrel at a rate which is predetermined and repeatable regardless of the manner in which the switch is operated, a nozzle means extending from said valve assembly into the barrel and shaped for receiving said paper cones in a fixed position thereon, said nozzle means being larger at its base end than at its other end in accordance with the size and shape of the paper cone, whereby the base of the paper cone bears upon and is supported by the larger base end of the nozzle means, the nozzle means extends into the paper cone a substantial distance, the paper cone being supported by the nozzle means, wherein the base of the cone rests against the base of the nozzle means to hold said cone in a fixed position, an access hole being defined in the side wall of the barrel near the breech of the barrel for permitting insertion of a paper cone over said nozzle means, the length of the access hole extending beyond the end of the nozzle means to facilitate insertion of the paper cones, and means for supporting the barrel and valve assembly, said means permitting both vertical and horizontal movements of said barrel and said valve assembly, and said barrel and valve assembly supporting means being movable independently of the pressurized gas supply.

2. Apparatus according to claim 1 wherein said means for suspending the barrel and valve assembly comprises a first spring and chain arrangement connected between said valve assembly and a rod adapted to be secured in position extending transversely along the overhead of the vehicle, and a second spring and chain arrangement connected between a position on said barrel and said rod, the chain arrangement permitting adjustment of the angular position of the apparatus to provide such relatively fixed position while said springs permit deviation from such position.

3. Apparatus according to claim 1 wherein the paper cones are made of sheets of paper rolled into a cone shape and held by removable tape, with the length of the cones being such that said nozzle means extends at least about half-way into the cones and the end of the nozzle means bears upon the inner surface of the cone while the enlarged base of the nozzle means bears upon the inner edge of the base of the cone whereby the cones are held in a relatively fixed position for firing.

4. Apparatus according to claim 1 wherein the means for suspending the barrel and valve assembly comprises elongated means extending from said valve assembly and adapted to be secured to the overhead of the vehicle, the elongated means being adjustable and including resilient means, the barrel being adapted to be supported at an aperture in the vehicle wall.

*5. In combination, a paper cone; apparatus for projecting said paper cone from a moving vehicle comprising:*

*(a) an elongated barrel;*

*(b) an electrically operated solenoid valve assembly;*

*(c) means connecting said valve assembly to one end of said barrel for forming a unitary assembly;*

*(d) a supply of pressurized gas;*

*(e) a flexible conduit connecting said gas supply to said valve assembly;*

*(f) an electrical switch associated with said valve assembly for engaging the solenoid of the valve to release the gas into said barrel in a manner which is repeatable regardless of the manner in which the switch is operated;*

*(g) a nozzle means extending from the valve assembly into the barrel for receiving said paper cone over the end opening of the nozzle means with the interior surface of the cone resting on the nozzle and the nozzle directed toward the apex of the cone whereby the engagement between the cone and the nozzle can initially restrict the flow of gas from the interior of the cone as gas is released into the interior of the cone through the end opening of the nozzle fixed position thereon;*

*(h) an access hole defined in the side wall of the barrel near the one end of the barrel for permitting*

*insertion of a paper cone in cone projecting alignment with said nozzle means, the length of the access hole extending beyond the end of the nozzle means to facilitate insertion of the paper core, and*

*(i) means for supporting the barrel and valve assembly to permit both vertical and horizontal movement independent of the gas supply.*

*6. Apparatus as defined in claim 5 wherein said means for supporting comprises at least one flexible member connected at one end to said unitary assembly for suspending said unitary assembly from the overhead of the vehicle.*

*7. Apparatus as defined in claim 6 wherein said flexible member is a spring and chain arrangement.*

References Cited

The following references, cited by the Examiner, are of record in the patented file of this patent or the original patent.

UNITED STATES PATENTS

| | | | |
|---|---|---|---|
| 2,116,860 | 5/1938 | Blaylock | 124—32 X |
| 3,046,694 | 7/1962 | Holderer | 124—11 X |
| 3,138,382 | 6/1964 | Barker et al. | 124—12 X |

OTHER REFERENCES

Jet Tubes Hurl Circulars From Moving Car, Popular Mechanics, vol. 111, No. 5, p. 78.

RICHARD C. PINKHAM, Primary Examiner

W. R. BROWNE, Assistant Examiner